UNITED STATES PATENT OFFICE.

STEPHEN MANNINGTON CAFFYN, OF MIDDLE BRIGHTON, NEAR MELBOURNE, VICTORIA.

LIQUID EXTRACT OF MEAT.

SPECIFICATION forming part of Letters Patent No. 384,823, dated June 19, 1888.

Application filed March 29, 1888. Serial No. 268,891. (No specimens.)

*To all whom it may concern:*

Be it known that I, STEPHEN MANNINGTON CAFFYN, a subject of the Queen of Great Britain, residing at Black Street, Middle Brighton, near Melbourne, in the British Colony of Victoria, surgeon, have invented an Improved Liquid Extract of Meat Compound, of which the following is a specification.

This invention has been designed for the purpose of preparing a liquid extract of meat which shall retain all its nutritive properties in such a form as to be absorbed by the human system without the aid of the ordinary processes of digestion, so that when injected under the skin or into the bowels, or in any other way absorbed by the body, its nutritive properties become active. This preparation is totally unlike all other prepared meat-foods in that it contains the quantity of carbon necessary to make a perfect food, and in that heat is never applied to it, and in that it is not concentrated, so that it is in the same condition as when in the body of the bullock and as capable of absorption. Meat foods that have once been subjected to heat or the action of chemicals descend in value to the level of beef tea or Liebig's extract, and in illness are practically valueless. In typhoid, where the bowels may not be used, and in consumption of the bowels, where they cannot, my extract, which I call "Liquor Carnis," is a specific.

In preparing this extract I proceed in the following manner: I take lean meat only, cutting away the fat, and I cut this lean meat into slices of convenient thickness, which I subject to such a pressure as will express all its moisture or juices. These I collect into a suitable vessel, and after having so collected I mix with it about one-third of its bulk of glycerine, and to every ounce of this mixture I add about ten grains of chloride of sodium. The glycerine is for the purpose of providing the necessary carbon and to act as a preservative, and the chloride of sodium is used both for its preservative and flavoring properties.

This is my new extract of meat compound; but to it there may be added other materials either of a stimulating character—such as wine—or of a flavoring character—such as essence of thyme; but these are not essential to the preparation of my meat extract.

I have said that the meat is to be subjected to pressure for the purpose of expressing its moisture or juice, and for this purpose any power may be used for giving the pressure, but I believe hydraulic power is the best. Any press which will express the juice and collect it into a suitable receiver will answer the purpose, and any one skilled in the art could readily make such a press. My invention, therefore, does not consist in any special form of apparatus for expressing the juice or moisture of meat; but it does consist in, and I therefore claim—

As a new article of manufacture, a liquid extract of meat compound consisting of a combination of the raw juices of lean meat with glycerine, to which may be added chloride of sodium or the other ingredients mentioned, neither said compound nor its ingredients being either concentrated or subjected to any degree of heat whatever, substantially as herein described and explained.

STEPHEN MANNINGTON CAFFYN.

Witnesses:
  WALTER SMYTHE BAYSTON,
      *Melbourne, Patent Agent.*
  WALTER CHARLES HART,
      *Melbourne, Clerk.*